United States Patent [19]

Dorgan

[11] Patent Number: 5,168,946
[45] Date of Patent: Dec. 8, 1992

[54] TRACK-LAYING VEHICLE ELECTRIC DRIVE SYSTEM

[75] Inventor: Robert J. Dorgan, Pittsfield, Mass.

[73] Assignee: General Electric Company, Pitsfield, Mass.

[21] Appl. No.: 756,738

[22] Filed: Sep. 9, 1991

[51] Int. Cl.⁵ .................. B62D 11/00; F16H 37/06
[52] U.S. Cl. ............................. 180/6.44; 180/6.48; 475/5; 475/6
[58] Field of Search ............ 180/6.2, 6.44, 6.48, 180/6.5, 9.44; 74/661; 475/5, 6, 28, 18

[56] References Cited

U.S. PATENT DOCUMENTS

| | | | |
|---|---|---|---|
| 2,305,373 | 12/1942 | Adamson | 74/661 |
| 3,503,278 | 8/1968 | Livezey | 74/661 |
| 4,090,415 | 5/1978 | Gorrell et al. | 74/769 |
| 4,270,622 | 6/1981 | Travis | 180/65 C |
| 4,392,393 | 7/1983 | Montgomery | 74/661 |
| 4,685,354 | 8/1987 | McCabria | 475/5 |
| 4,803,897 | 2/1989 | Reed | 74/720.5 |
| 4,815,334 | 3/1989 | Lexen | 74/661 |
| 4,817,460 | 4/1989 | Reed | 180/6.44 X |

Primary Examiner—Mitchell J. Hill
Assistant Examiner—Florian Zeender
Attorney, Agent, or Firm—Stephen A. Young

[57] ABSTRACT

An electric drive system for track-laying vehicles includes a pair of electric motors for respectively driving the two vehicle tracks in low range forward and reverse, variable speed propulsion and steer. The output of a third electrical motor is additively combined with the outputs of the pair of motors to provide high range forward and reverse, variable speed propulsion and steer.

11 Claims, 1 Drawing Sheet

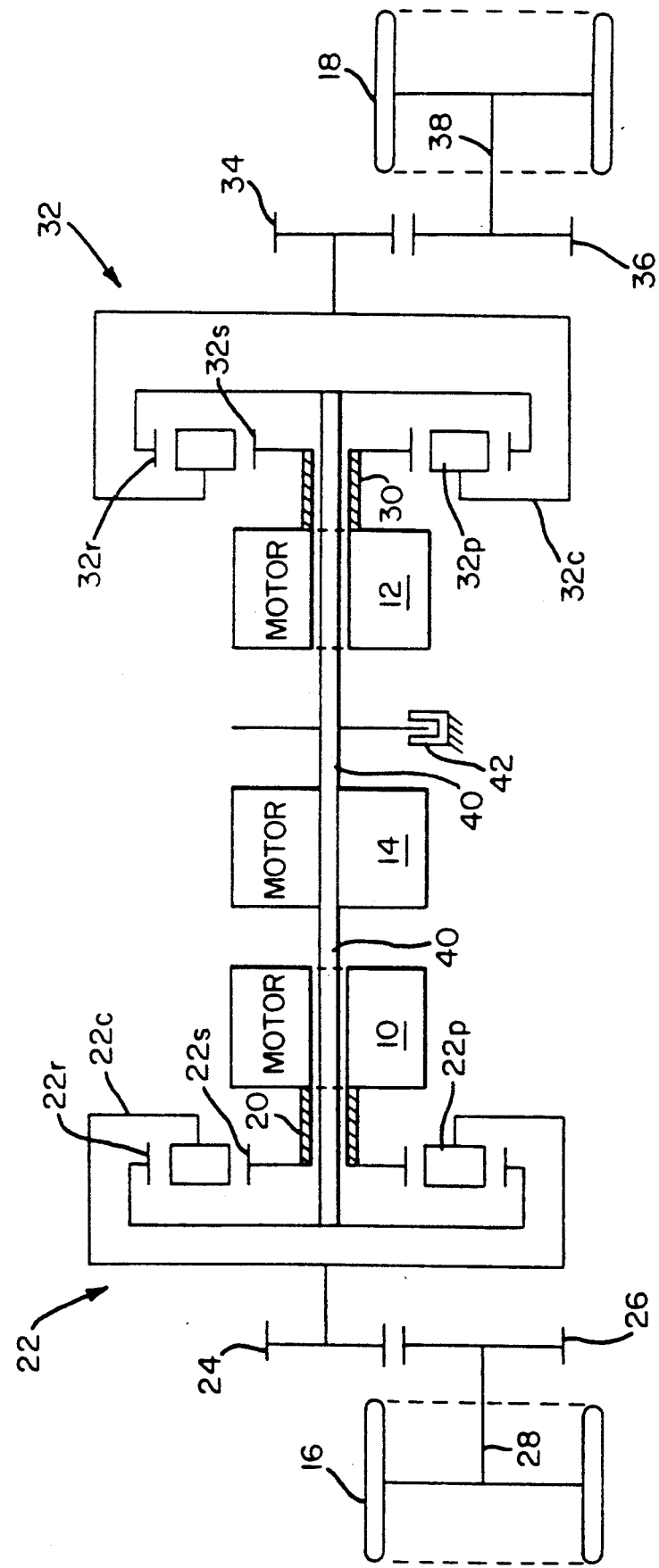

TRACK-LAYING VEHICLE ELECTRIC DRIVE SYSTEM

The present invention relates to drive systems for track-laying vehicles and particularly to a drive system utilizing electric motors as the vehicle prime mover.

BACKGROUND OF THE INVENTION

It is anticipated that future military fighting vehicles, such as tanks, which will likely be of the track-laying type, will utilize electric power to drive their weapons systems. Consequently, significant research efforts are being directed to developing electric drives for tank weapons systems. Under these circumstances, it would be advantageous to scale up the weapons systems electric drive, such that it could also be used to power vehicle propulsion, i.e., the weapons and vehicle propulsion systems share a common electric power supply. Since track-laying vehicles require imposing speed differentials on the two vehicle tracks to execute steering maneuvers in skid-steer fashion, the straight forward approach to electric vehicle propulsion would seem to be to provide a separate electric motor to drive each track. Unfortunately, because of the large torque ratios required and the need to transfer regenerative power from the inside track to the outside track especially during a high speed steer, this approach is not particularly practical.

SUMMARY OF THE INVENTION

It is accordingly an objective of the present invention to provide an electric drive system for a track-laying vehicle. The system utilizes a transmission to combine the variable speed, bidirectional mechanical outputs of at least three electric motors in mechanical drive paths to the two vehicle tracks to achieve multi-range, straightline and steer vehicle propulsion in a highly controllable and efficient manner.

To this end, the mechanical output of a first of the electric motors drives a left combining gear set to produce a left transmission output, while the mechanical output of a second of the electric motors drives a right combining gear set to produce a right transmission output. The mechanical outputs of the first and second motors are uniformly varied in speed in either direction to produce low range forward and reverse straight line vehicle propulsion and differentially varied in speed to produce vehicle steer. To provide high range straightline and steer propulsion, the mechanical output of the third electric motor is commonly applied to the left and right combining gear sets so as to be additively combined with the mechanical outputs of each of the first and second electric motors.

The invention accordingly comprises the features of construction, combination of elements and arrangement of parts, all as detailed hereinafter, and the scope of the invention will be indicated in the claims.

BRIEF DESCRIPTION OF THE DRAWING

For a full understanding of the nature and objects of the present invention, reference may be had to the following Detailed Description taken in connection with the following drawing, in which the sole figure is a schematic diagram of an electric drive system constructed in accordance with an embodiment of the present invention to propel a track-laying vehicle.

DETAILED DESCRIPTION

In the embodiment of the invention seen in the drawing, three electric motors 10, 12 and 14 are utilized as an electric drive producing mechanical inputs to a transmission to, in turn, propel left 16 and right 18 tracks of a track-laying vehicle, such as a military tank. These electric motors draw electrical power from an onboard motor-generator set or, for a small vehicle, storage batteries (not shown). The mechanical output of motor 10 on a sleeve shaft 20 is applied to a sun gear 22s of a left transmission combining gear set, such as a planetary gear set generally indicated at 22. A carrier 22c for the planetary pinion gears 22p of planetary gear set 22 drives a spur-gear 24 which meshes with a spur gear 26 to, in turn, drive left vehicle track 16, via transmission output shaft 28.

In the same manner, the mechanical output of electric motor 12, on sleeve shaft 30, drives a sun gear 32s of a transmission planetary gear set 32. The output of this gear set, on carrier 32c for planetary pinion gears 32p, drives the right vehicle track 18 via a set of spur gears 34 and 36 and right transmission output shaft 38. The planetary gear sets 22 and 32 are identical.

The mechanical output of motor 14, stationed intermediate motors 10 and 12, is developed on a shaft 40 which extends to left concentrically through motor 10 and its output sleeve shaft 20 and to the right concentrically through motor 12 and its output sleeve shaft 30. The leftward extension of shaft 40 drives the ring gear 22r of planetary gear set 22, while the rightward extension thereof drives the ring gear 32r of planetary gear set 32. A brake 42 is selectively engaged to ground shaft 40 and thus also ring gears 22r and 32r. It will be appreciated that the configuration of aligning the motors and their output shafts on a common centerline provides a compact arrangement of components conducive to convenient vehicle implementation.

For low range operation, brake 42 is engaged and motor 14 is de-energized. With ring gears 22r and 32r grounded to provide reaction force, the mechanical output of motor 10 drives the left vehicle track through the sun-to-carrier reduction of gear set 22 and the gear 24-to-gear 26 ratio, while the mechanical output of motor 12 drives the right vehicle track through the sun-to-carrier reduction of gear set 22 and gear 34-to-gear 36 ratio. Uniformly varying the speeds of motors 10 and 12 in the forward direction produces variable speed straightline vehicle propulsion in the forward direction. Variable speed, straightline propulsion in the reverse direction is achieved by uniformly varying the speeds of the motors 10 and 12 in the reverse direction. Vehicle steer in forward or reverse is then achieved by differential varying the speeds of these two motors, typically in equal and opposite increments. That is, the speed of one motor is increased by the same increment that the speed of the other motor is decreased.

To propel the vehicle in high range, brake 42 is released, and electric motor 14 is energized. The mechanical output of this motor is then commonly applied via its output shaft 40 to ring gears 22r and 32r to be additively combined in gear sets 22 and 32 with the mechanical outputs of motors 10 and 12. With all the motors turning in the forward direction, high range forward vehicle propulsion is achieved. High range propulsion in reverse is produced when all the motors are turning in the reverse direction. High range steer is produced by differentially varying the speeds of motors 10 and 12, just as in low range. It is seen that shaft 40 of motor 14 constitutes a cross shaft connecting gear sets 22 and 42 and thus beneficially serves as a highly efficient means for providing regenerative power flow (as much as 80% of the torque) from the inside track to the outside track during high range steer. This permits reductions in the ratings of the electric motors, their common power supply, and components of the requisite control unit. Cooling system requirements are thus also reduced.

While the present invention has been described in its application to skid-steered track-laying vehicles, it also has application to wheeled vehicles that have traditionally utilized electric drives, such as railway locomotives and heavy duty off-road vehicles, such as mining trucks, etc. In the case of locomotives, the current practice is to utilize a separate, large electric motor to drive each axle. Electric drives for off-road vehicles typically utilize two large electric motors to respectively drive the left and right traction wheels. Applying the principles of the present invention to these applications, wherein two electric motors supply the requisite torque for low range operation and a third electric motor in combination with the two low range motors satisfy the lower torque, increased speed requirements for high range operation, would result in significant reductions in motor sizes. That is, the cummulative size and weight of the three electric motors required to implement the present invention would be less than the combined size and weight of the two motors currently employed in these wheeled vehicle applications. Improved efficiency would also be achieved. Although the regenerative power transfer so important for steer propulsion in a track-laying vehicle is not a real consideration in off-road wheeled vehicles, the differential action afforded by the planetary gear sets and cross shaft of the present invention can assist in vehicle steer.

It is noted that the coaxial arrangement of the motor output shafts illustrated in the drawing, while desirable for compact packaging, requires specially constructed hollow, sleeve shaft motors 10 and 12. To avoid the added expense of these special motors, electric motor 14 may be moved to an offset position and equipped to drive the left and right planetary set ring gears via transfer gearing and a cross shaft that is not coaxial with the output shafts of motors 10 and 12, which can then be of conventional design.

In view of the foregoing, it is seen that the objectives of the invention set forth above, including those made apparent from the Detailed Description, are efficiently attained, and, since certain changes may be made in the constructions set forth without departing from the scope of the invention, it is intended that matters of detail be taken as illustrative and not in a limiting sense.

Having described the invention, what is claimed as new and desired to secure by Letter Patent is:

1. An electrical drive system for vehicles comprising, in combination:
   A. a first electric motor for developing a first variable speed, bidirectional output;
   B. a second electric motor for developing a second variable speed, bidirectional output;
   C. a third electric motor for developing a third variable speed output; and
   D. a transmission including
      1) a left output shaft drivingly connected to one vehicle track,
      2) a right output shaft drivingly connected to the other vehicle track,
      3) a left combining gear set having a first gear element driven by a said first output, a second gear element drivingly connected with said left output shaft, and a third gear element,
      4) a right combining gear set having a first gear element driven by said second output, a second gear element drivingly connected to said right output shaft, and a third gear element,
      5) a cross shaft for commonly applying said third output to said third gear elements of said left and right combining gear sets, and
      6) a brake operating to ground said third gear elements of said left and right combining gear sets to provide low range vehicle propulsion and steer, and with said third electric motor energized, said brake disengaged to release said third gear elements of said left and right combining gear sets to provide, in combination with said first and second electric motors, high range vehicle propulsion and steer.

2. The electric drive system defined in claim 1, wherein said third output is also bidirectional.

3. The electric drive system defined in claim 2, wherein said left and right combining gear sets are identical planetary gear sets.

4. The electric drive system defined in claim 3, wherein said first, second and third gear elements of said left and right combining gear sets are sun gears, planetary pinion gears and ring gears, respectively.

5. The electric drive system defined in claim 1, wherein said first, and second electric motors have respective first and second output shafts arranged in concentric relation with said cross shaft.

6. The electrical drive system defined in claim 5, wherein said first output shaft is a first sleeve shaft drivingly connected to said first gear element of said left combining gear set, said second output shaft is a second sleeve shaft drivingly connected to said first gear element of said right combining gear set, and said cross shaft is the output shaft of said third electric motor, said cross shaft extending coaxially through said first and second motors and said first and second sleeve shafts into driving connection with said third gear elements of said first and second combining gear sets.

7. The electric drive system defined in claim 6, wherein said third electric motor is positioned between said first and second motors.

8. The electric drive system defined in claim 7, wherein said left and right combining gear sets are identical planetary gear sets.

9. The electric drive system defined in claim 8, wherein said third output is also bidirectional.

10. The electric drive system defined in claim 9, wherein said first, second and third gear elements of said left and right combining gear sets are sun gears, planetary pinion gears and ring gears, respectively.

11. The electric drive system defined in claim 10, wherein said brake operates to selectively ground and release said cross shaft.

* * * * *